March 17, 1970     S. CHESS ET AL     3,501,559

MULTIPLE-POUR POLYURETHANE FOAMS

Filed Feb. 13, 1967

1. POUR FOAM MIX INTO MOLD.

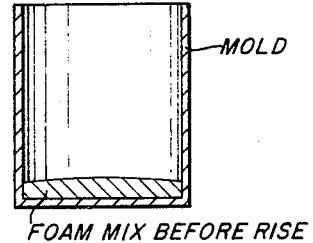

FOAM MIX BEFORE RISE

2. COVER FOAM MIX WITH NON-BONDING SHEET.

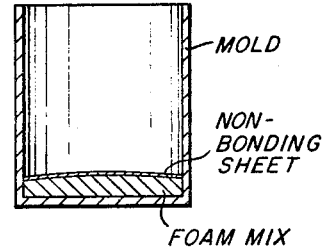

FOAM MIX

3. REMOVE NON-BONDING SHEET AFTER FOAM HAS RISEN AND IS TACK-FREE.

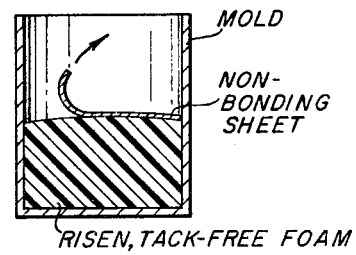

RISEN, TACK-FREE FOAM

4. POUR SECOND LAYER OF FOAM MIX AND REPEAT PREVIOUS CYCLE OF OPERATIONS.

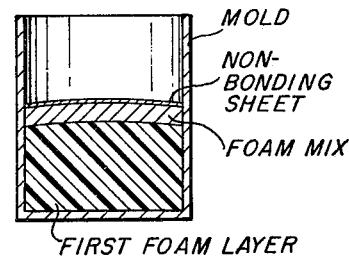

FIRST FOAM LAYER

INVENTORS
SAMUEL CHESS
BURNELL E. BROWN

BY Denis A. Firth

Agent

United States Patent Office 3,501,559
Patented Mar. 17, 1970

3,501,559
MULTIPLE-POUR POLYURETHANE FOAMS
Samuel Chess, San Pedro, and Burnell E. Brown, Torrance, Calif., assignors to The Upjohn Company, Kalamazoo, Mich., a corporation of Delaware
Filed Feb. 13, 1967, Ser. No. 615,388
Int. Cl. B29d 27/04
U.S. Cl. 264—51
3 Claims

ABSTRACT OF THE DISCLOSURE

The separation which takes place between successive layers of polyurethane foam when making multiple pours of rigid high density polyurethane foam (e.g. in filling large cavities for insulation, flotation in maritime vessels, packaging delicate instruments) is prevented by maintaining a sheet of non-bonding maetrial in contact with the rising foam surface of each layer as it is poured and removing the non-bonding sheet before the next pour is made.

BRIEF SUMMARY OF THE INVENTION

This invention relates to rigid high density polyurethane foams and is more particularly concerned with the preparation of multilayered pours of polyurethane foam which are free from separation at the abutting surfaces of adjacent layers, and with the multilayered polyurethane foams so produced.

The drawing illustrates the sequence of steps utilized in carrying out the multiple-pour steps of the process.

DETAILED DESCRIPTION

In the preparation of rigid high density polyurethane foams, particularly when said foam is being poured-in-place in a large cavity, it is often found necessary to make multiple pours. By "high density polyurethane foam" is meant a polyurethane foam having a density of at least about 3 pounds per cubic foot up to about 25 pounds per cubic foot or even higher. Examples of situations in which multiple pours are necessary are in the filling of cavities in the hulls, bulkheads, and like cavities in ships and aeroplanes and in the packaging of bulky machinery, instruments and the like. In such applications it is generally impractical, unless the cross-sectional area is very small, to fill the cavity by pouring in a singe batch of polyurethane foam mix. Thus, in general, it is not practical under free or restricted rise conditions, to produce high density polyurethane foam wherein the height through which the foam has risen is in excess of about 1 foot to 18 inches. Hence, when it is necessary to fill a cavity having a depth greater than 1 foot to 18 inches the operation has to be performed in two or more steps. The first batch of foam mix placed in the cavity is allowed to rise and set to a solid, tack-free state before a second batch of foam mix is poured on the top of the first layers. Similarly, the second batch of foam mix is allowed to foam and set to a solid, tack-free state before a further batch of foam mix is added. The process is repeated as many times as are necessary to fill the cavity in question.

The resulting polyurethane foam is multilayered, the various layers being bonded together at the interfaces. However, examination of a cross-sectional specimen of such foams, taken in the direction of rise, frequently reveals separation, in whole or in part, between the various layers of foam. Such separation, commonly referred to as "delamination," is highly undesirable since it results in loss or weakening of structural strength in the foam and also has a deleterious effect on thermal insulating properties.

We have now found that said delamination in multiple pours of high density polyurethane foam can be prevented by use of the process which is described below. In its broadest aspect the present invention comprises a process for preventing separation at the abutting surfaces of successively poured layers of polyurethane foam in a multiple pour high density polyurethane foam which process comprises covering the rising surface of each polyurethane foam layer, after pouring and while still foaming, with a sheet of non-bonding material, said sheet having a peripheral configuration corresponding substantially to that of the surface of the rising foam, maintaining said sheet of non-bonding material in contact with the surface of the newly poured layer at least until the latter is tack-free, and removing said sheet of non-bonding material before pouring the subsequent layer of foam.

The term "non-bonding material" as used throughout the specification and claims means any material which does not form a permanent bond with a polyurethane when exposed to a polyurethane-forming reaction mixture. By permanent bond is meant a bond which cannot be broken by applying reasonable shearing forces thereto, for example by application of manual force designed to pull the two materials apart. Examples of non-bonding materials are polyethylene, polypropylene, polyvinylchoride, Teflon and the like as well as materials such as wood, fibreboard, copper, auminum, steel, and like metals which have been coated, either completely or at least on the surface thereof which is exposed to the polyurethane foam mix, with a mold release agent such as those commonly employed in the art to facilitate the separation of molded polyurethane products from the molds wherein they have been shaped.

Any of the mold release agents known in the art can be used for the above purpose. Examples of such agents are silicone oils, metal stearates such as zinc stearate, aluminum stearate and the like, and waxes such as hydrocarbon waxes, carnauba wax, and the like.

Advantageously said non-bonding materials are fabricated in sheet form for use in the process of the invention. Preferably said sheets have sufficient flexibility to conform closely to changing contours of the surface of the rising polyurethane foam during the foaming process. The preferred non-bonding materials are polyolefins particularly polyethylene. If desired, said materials can be employed in sheet form with a backing of a supporting sheet of wood, metal and the like, but preferably said materials are employed as unsupported sheets having a thickness of the order of about 2 mils to about 15 mils.

The process of the invention can be employed using any of the polyurethane foam producing formulations hitherto employed in the art in the preparation of rigid high density polyurethane foams. The nature of the foam producing formulations is not in any way critical to success. Similarly the polyurethane foam can be produced by any of the one-shot, prepolymer or quasiprepolymer methods well-known in the art. The methods and formulations of making high density polyurethane foams from polyisocyanates and polyols in the presence of catalyst and blowing agent are well-known in the art and do not require detailed description here. Illustrative of the known methods and formulations which can be employed in making the polyurethane foams in the process of the invention are those described by Saunders et al. Polyurethanes, Chemistry, and Technology, Part II, p. 193 et seq., 1964, Interscience Publishers, New York, and in U.S. Patents 3,252,925; 3,252,922; 3,245,922; 3,240,730; 3,235,518; 3,087,901; 3,085,983; 3,080,329; 3,075,928; 3,075,926; 3,073,788; 3,072,582; 3,061,556; 3,060,137; 3,053,778; 3,050,477; 3,039,976; 3,037,946, 3,036,022; and U.S. Reissue 24,514.

As will be readily apparent to one skilled in the art the required density of foams employed in the process of the invention can be achieved by appropriate regulation of the amount of blowing agent employed in the reaction mix. In many cases, the blowing agent employed is water (which acts as blowing agent by generation of carbon dioxide in reaction with the polyisocyanate) or a combination of water and a volatile halogenated hydrocarbon having a boiling point below about 110° C. and preferably below about 50° C. Examples of the latter are trichloromonofluoromethane, dichlorodifluoromethane, chlorotrifluoromethane, and the like. When the higher density materials (10 p.c.f. and above) are required it is necessary to control very carefully the amount of water added to the reaction mix and traces of water carried into the reaction mix in admixture with the polyol and other components become significant under these circumstances.

In carrying out the process of the invention the foam reaction mixture is prepared manually or, preferably, using a conventional foam mixing head in accordance with procedures described and exemplified in the above cited art. The foam mix is poured or dispensed into the floor of the cavity, mold, or other receptacle in which the multiple pour foam is to be formed. A sheet of non-bonding material, cut or shaped to a peripheral configuration corresponding approximately to the horizontal cross-sectional shape of the cavity to be filled, is then placed over the rising foam. It is essential that the sheet non-bonding material be brought into contact with the upper surface of the foam while the latter is still rising. Preferably the non-bonding material is brought into contact with the foam at the earliest possible moment after the foam has been poured and before it has commenced to rise. However, depending upon the nature of the particular cavity in which foaming is taking place, it may not always be possible to place the non-bonding material in contact with the foam mix before foam rise commences. In such cases the sheet of non-bonding material is brought into position as quickly as the circumstances will allow. In general the non-bonding material should be in contact with the rising foam at any time before the rise is more than about 90 to 95% complete in order to achieve satisfactory results in the process of the invention. In certain cases foam rise can have proceeded further than this point before the non-bonding material is brought into position and still yield useful overall results in the process of the invention. Such cases are, however, the exception rather than the rule.

When the non-bonding material is light-weight as in the case of thin sheets of polyethylene and the like, the presence of the sheet of non-bonding material in contact with the foam surface does not affect significantly the freedom of the foam to rise and the final height of rise of the foam closely approximates the height of rise which the foam would reach in the absence of the covering sheet. However, when the non-bonding material is of comparatively heavier weight, as for example in the case of metal or wood coated with a mold release agent, the weight of the sheet of non-bonding material can restrict the height of foam rise to a significant degree. In such cases the sheet of non-bonding material produces "packing" of the foam i.e. the density of the resulting foam is greater than it would be if the foam were allowed to rise freely in the absence of a covering sheet. The amount of packing will naturally be directly proportional to the weight of the sheet of non-bonding material and due allowance has to be made for the possibility and extent of packing in computing the final foam density required in any particular instance.

As described above the peripheral configuration of the sheet of non-bonding material placed in contact with the surface of the foam in accordance with the invention preferably approximates that of a horizontal cross-section taken through the cavity to be filled; i.e. with the sheet in place on top of the rising foam there should not be more than about 6 inches between the edge of the sheet and the edge of the foam at any given point. However, as will be obvious to one skilled in the art, the horizontal cross-sectional shape of the cavity may vary at different levels in the cavity and due allowance for such variation must be made in carrying out the process of the invention. For example when the cross-sectional configuration of the cavity is greater at the level at which the foam mix is poured than it is at the level corresponding to final height of rise of the foam, the shape of the sheet of non-bonding material should preferably correspond to the cross-sectional configuration of the cavity at the top of the intended rise in order to avoid interference between the edge of the sheet of non-bonding material and the side wall of the cavity during the foam rise.

The sheet of non-bonding material is maintained in contact with the surface of the foam producing mixture at least until foam rise is complete and the foam has set to a "non-tacky" state. This stage is one well-recognized in the art and is generally taken to be the point at which the foam mix is no longer sticky to the touch. At any time after this stage has been reached the sheet of non-bonding material can be removed from the surface of the foam. However, it has been found advantageous to leave the non-bonding material in contact with the surface of the foam until such time as the next layer of foam is to be poured. This is especially so when there is to be a long interval, for example one of several hours or even days, between the pouring of successive layers of foam.

When the first layer of foam has been poured in accordance with the process of the invention, as described above, and the sheet of non-bonding material has been removed from the surface of the pour, the second layer of foam is poured in exactly the same manner using the same or a similar sheet of non-bonding material in the manner described above. The process of the invention is repeated as many times as are necessary to fill the cavity to the desired level with the proviso that it is unnecessary to employ the sheet of non-bonding material when pouring the final layer of the multiple pour.

The following examples describe the manner and process of making and using the invention and set forth the best mode contemplated by the inventors of carrying out the invention but are not to be construed as limiting.

EXAMPLE 1

A multiple pour polyurethane foam was prepared as follows:

The cavity to be filled was a 4 ft. x 4 ft. cube formed by a wooden mold. The cavity was filled by pouring three separate charges of foam mix, each charge comprising 80 to 100 pounds of foam mixture. The foam mix in each case was machine mixed and discharged directly into the cavity mold. The ingredients used to prepare each foam mix were as follows (all proportions in parts by weight):

| | |
|---|---|
| Polymethylene polyphenyl isocyanate (eq. wt.—133) | 84.6 |
| Toluene diisocyanate (80 parts 2,4-isomer; 20 parts 2,6-isomer) | 24.5 |
| Polyether polyol (HO number=ca. 435) (polyoxypropylene polyether based on methyl glucoside) | 106 |
| Phosphorus containing polyol (dibutylpyrophosphate-propylene oxide adduct, equiv. wt.=ca. 260) | 24.5 |
| Organosilicone surfactant (L-5320: Union Carbide) | 2.0 |
| Triethylamine | 0.75 |
| Freon 11 B (modified trichloromonfluoromethane) | 5.1 |

Where the first batch of foam mix had been poured into the mold and had reached the "cream time" (approximately 2.5 minutes after pour; cream time indicated by color change and milky appearance in the mix) a sheet (3.5 x 3.5 ft.) of polyethylene film (thickness 5 mils) was placed over the surface of the foam mix and allowed to remain there throughout the foam rise and for a period of approximately 3 hours after the rise was complete. At the end of this time, the polyethylene sheet was removed and the second batch of foam mix was poured. A polyethylene sheet of the same dimension and thickness as used in the first pour was placed over the surface of the foam mix as soon as the latter reached cream time. The sheet was left in place throughout the foam rise and for a period of approximately 3 hours thereafter. At the end of this time the sheet was removed and the third batch of foam mix was poured into the mold and allowed to rise without covering with a polyethylene sheet. The resulting multiple pour foam (overall density 5–6 lbs./cu. ft.) was cured for 24 hrs. at circa 25° C. Vertical cuts were made through the foam at various points to expose vertical cross sections of the multiple pour. No evidence of delamination at the junction of the foam layers was found.

In contrast, a multiple pour made exactly as described above but omitting the use of a polyethylene sheet, showed marked delamination at the junction of the foam layers.

The above procedure for the preparation of a multiple pour foam was repeated using a mold of cross-section 4 ft. x 8 ft. and depth 4 ft. The foam batch size was increased to approximately 160 lbs. per pour and the dimensions of the polyethylene sheet were increased to 3.5 x 7 ft. No evidence of delamination between layers of the resulting multiple pour was found in marked contrast to severe delamination in a multiple pour prepared in the same way but omitting the use of the polyethylene film.

We claim:
1. A process for preventing separation at the abutting surfaces of successively poured layers of polyurethane foam in a multiple pour rigid high density polyurethane foam which process comprises covering the rising surface of each polyurethane foam layer, after pouring and while still foaming, with a sheet of non-bonding material said sheet having a peripheral configuration corresponding substantially to that of the surface of the rising foam, maintaining said sheet of non-bonding material in contact with the surface of the newly poured layer at least until the latter is tack-free, removing said sheet of non-bonding material and pouring the subsequent layer of foam.

2. The process of claim 1 wherein the sheet of non-bonding material is sufficiently flexible to conform to the changing contour of the rising foam surface.

3. The process of claim 1 wherein the sheet of non-bonding material is a polyethylene film.

References Cited

UNITED STATES PATENTS

| | | | |
|---|---|---|---|
| 2,898,626 | 8/1959 | Alderfer et al. | 264—47 XR |
| 2,956,310 | 10/1960 | Roop et al. | 264—54 |
| 2,957,207 | 10/1960 | Roop et al. | 264—54 |
| 2,962,746 | 12/1960 | Heroy et al. | 264—54 XR |
| 3,016,575 | 1/1962 | Ebneta | 264—48 |
| 3,080,613 | 3/1963 | Wall et al. | 264—54 |
| 3,161,436 | 12/1964 | Hood | 264—46XR |
| 3,423,490 | 1/1969 | Trogdon et al. | 264—54 XR |
| 3,229,441 | 1/1966 | Heffner | 264—45 XR |
| 3,366,718 | 1/1968 | Komada | 264—45 |

FOREIGN PATENTS 1,345,810 11/1963 France.

PHILIP E. ANDERSON, Primary Examiner

U.S. Cl. X.R.

260—2.5; 264—54, 331